(12) United States Patent
Havlik et al.

(10) Patent No.: US 10,408,258 B2
(45) Date of Patent: Sep. 10, 2019

(54) TILTING SEGMENT FOR A SHAFT BEARING DEVICE, AND SHAFT BEARING DEVICE

(71) Applicant: MAN DIESEL & TURBO SE, Augsburg (DE)

(72) Inventors: Nico Havlik, Berlin (DE); Michael Lutz, Rothemühle (DE); Uwe Rockstroh, Sonthofen (DE); Christian Wacker, Berlin (DE); Jan Klausmann, Berlin (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 15/113,685

(22) PCT Filed: Jan. 22, 2015

(86) PCT No.: PCT/EP2015/000123
§ 371 (c)(1),
(2) Date: Jul. 22, 2016

(87) PCT Pub. No.: WO2015/110267
PCT Pub. Date: Jul. 30, 2015

(65) Prior Publication Data
US 2017/0009805 A1 Jan. 12, 2017

(30) Foreign Application Priority Data
Jan. 24, 2014 (DE) .................. 10 2014 000 775

(51) Int. Cl.
| F16C 17/03 | (2006.01) |
| F16C 33/10 | (2006.01) |
| F16C 37/00 | (2006.01) |

(52) U.S. Cl.
CPC ............ *F16C 17/03* (2013.01); *F16C 33/107* (2013.01); *F16C 33/1065* (2013.01); *F16C 37/00* (2013.01); *F16C 37/002* (2013.01)

(58) Field of Classification Search
CPC ........ F16C 17/03; F16C 17/035; F16C 17/06; F16C 17/065
See application file for complete search history.

(56) References Cited

U.S. PATENT DOCUMENTS

| 2,731,305 | A | | 1/1956 | Wilcock |
| 3,004,804 | A | * | 10/1961 | Pinkus .................... F16C 17/03 384/311 |

(Continued)

FOREIGN PATENT DOCUMENTS

| CA | 1186358 | 4/1985 |
| CN | 1776241 | 5/2006 |

(Continued)

OTHER PUBLICATIONS

Office Action dated Sep. 14, 2017 which issued in the corresponding Korean Patent Application No. 10-2016-7018595.

(Continued)

*Primary Examiner* — James Pilkington
(74) *Attorney, Agent, or Firm* — Cozen O'Connor

(57) ABSTRACT

Tilting segment for a shaft bearing device, with a base body that has a slide bearing face bounded by a segment leading edge extending in axial direction, a segment trailing edge likewise extending in axial direction, and by lateral edges extending in circumferential direction between the segment leading edge and the segment trailing edge. A groove that extends in axial direction and is located nearer to the segment trailing edge than it is to the segment leading edge is incorporated in the slide bearing face.

14 Claims, 2 Drawing Sheets

(56) References Cited

U.S. PATENT DOCUMENTS

| | | | | |
|---|---|---|---|---|
| 3,339,990 | A | * | 9/1967 | Wendt ............... F16C 17/03 384/311 |
| 3,887,245 | A | * | 6/1975 | Rouch ............... F16C 13/04 384/100 |
| 3,891,281 | A | | 6/1975 | Jenness |
| 4,323,286 | A | * | 4/1982 | Vohr ............... F16C 33/108 384/317 |
| 5,772,335 | A | | 6/1998 | Miller |
| 6,361,215 | B1 | | 3/2002 | Wilkes et al. |
| 6,485,182 | B2 | | 10/2002 | Nicholas |
| 6,499,883 | B2 | * | 12/2002 | Miller ............... F16C 17/03 384/117 |
| 2002/0110295 | A1 | | 8/2002 | Miller |
| 2013/0330030 | A1 | | 12/2013 | Suzuki et al. |
| 2014/0377063 | A1 | * | 12/2014 | Guerenbourg ......... F16C 17/02 416/1 |

FOREIGN PATENT DOCUMENTS

| | | |
|---|---|---|
| CN | 101216065 | 7/2008 |
| CN | 104234949 | 12/2014 |
| DE | 3117746 | 12/1982 |
| EP | 0064598 | 11/1982 |
| EP | 2 679 839 | 1/2014 |
| EP | 2679839 | 1/2014 |
| EP | 2816226 | 12/2014 |
| JP | S 56-141427 | 11/1981 |
| JP | 02-31917 Y2 | 8/1990 |
| JP | 09-144750 | 6/1997 |
| JP | H09 144750 | 6/1997 |
| JP | 2001-517288 | 10/2001 |
| JP | 2008-151239 | 7/2008 |
| WO | WO 98/44269 | 10/1998 |
| WO | WO 2012/114445 | 8/2012 |

OTHER PUBLICATIONS

Office Action dated Oct. 26, 2017 which issued in the corresponding Chinese Patent Application No. 201580005589.7.
Office Action dated Mar. 7, 2018 which issued in the corresponding Korean Patent Application No. 10-2016-7018595.
Office Action dated Jun. 17, 2019 issued in Chinese Patent Application No. 20158005589.7.

* cited by examiner

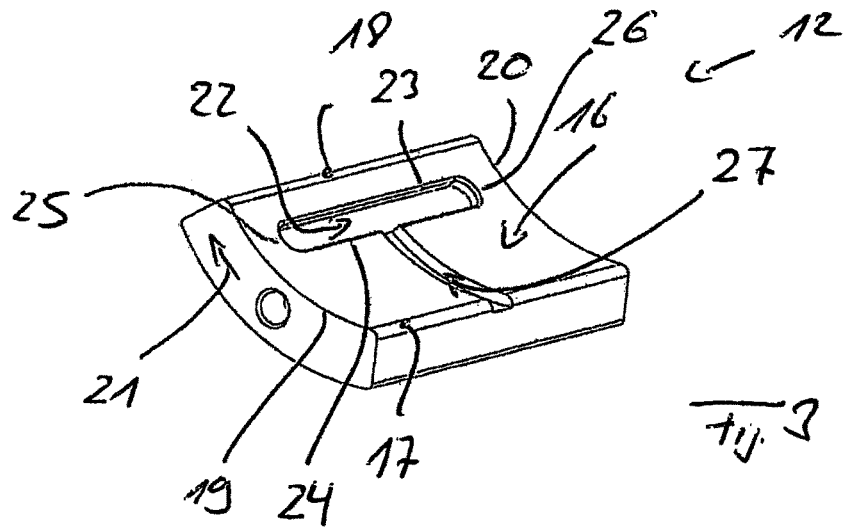
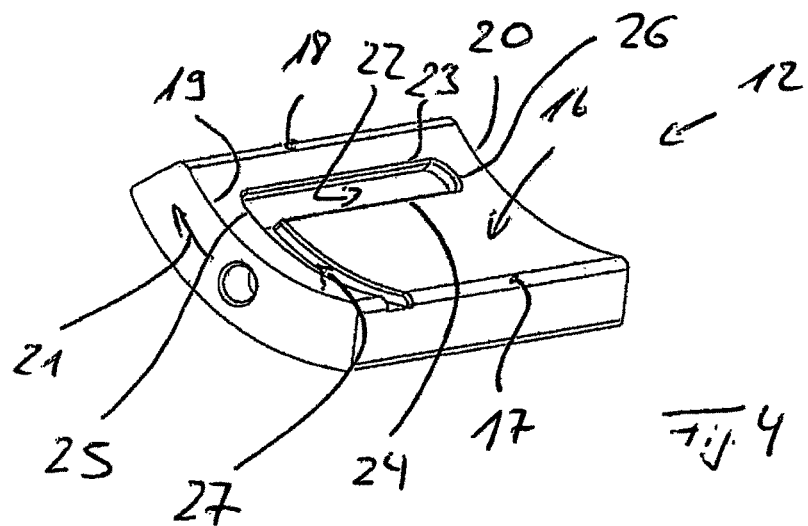
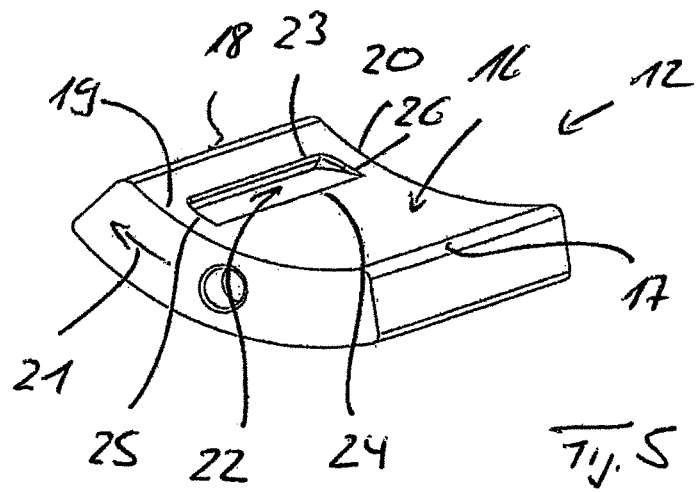

TILTING SEGMENT FOR A SHAFT BEARING DEVICE, AND SHAFT BEARING DEVICE

CROSS REFERENCE TO RELATED APPLICATIONS

This is a U.S. national stage of application No. PCT/EP2015/000123, filed on Jan. 22, 2015. Priority is claimed on German Application No.: DE102014000775.8, filed Jan. 24, 2014, the content of which is incorporated here by reference.

BACKGROUND OF THE INVENTION

1. Field of the Invention

The invention is directed to a tilting segment for a shaft bearing device and a shaft bearing device.

2. Description of the Prior Art

A shaft bearing device for slide bearing support of a rotating shaft comprising a bearing base body and a plurality of tilting segments received at the bearing base body and positioned one behind the other in circumferential direction is known from U.S. Pat. No. 6,361,215 B1. Each of the tilting segments has a slide bearing face bounded on one side by a segment leading edge extending in axial direction and a segment trailing edge extending likewise in axial direction and on the other side by lateral edges extending in circumferential direction between the segment leading edge and the segment trailing edge. It is further known from U.S. Pat. No. 6,361,215 B1 that a so-called directed lubrication or a so-called grooved lubrication can be used at a shaft bearing device of this type. The grooved lubrication has the advantage of a better damping of vibrations, while directed lubrication has the advantage of lower oil consumption and, therefore, lower power loss. In order to provide a shaft bearing device with lower power loss and reduced vibration behavior at the same time, a groove extending in axial direction, or leading edge groove as it is called, via which the tilting segment is supplied with oil is provided according to U.S. Pat. No. 6,361,215 B1 at the start of the slider surface of the tilting segment adjacent to the segment leading edge. Likewise introduced into the slide bearing face are grooves which extend in circumferential direction, run adjacent to the lateral edges and extend up to the region of the trailing edge of the tilting segment.

These grooves, which extend in circumferential direction in the tilting segments and which are known from U.S. Pat. No. 6,361,215 B1, reduce the lateral outflow of oil from the respective tilting segment. With this reduced lateral oil flow, a defined amount of oil is conveyed into the divergent lubricating gap at the end of the segment, where it provides for improved vibration damping of possible vibrations known as synchronous vibrations and subsynchronous vibrations.

A further shaft bearing device with tilting segments is known from U.S. Pat. No. 6,485,182 B1. According to this prior art, the tilting segments are supplied with oil via a gap formed between adjacent tilting segments.

The shaft bearing devices with tilting segments known from the prior art have the problem that the tilting segments, which are loaded relatively lightly in operation, have a tendency toward segment flutter, as it is called.

Segment flutter describes subsynchronous vibrations induced in the bearing itself. These subsynchronous vibrations occur as a result of the continuous oscillation of the unloaded tilting segments between two different balance points. The tilting segment cannot occupy a stable position and is therefore unstable. Segment flutter can occur, for example, as a result of deficient lubrication. This is the case when the lubricating gap cannot be completely filled with lubricant. This can occur when the eccentricity between the center point of the shaft and the center point of the bearing is very great. In this case, the lubricating gap widths between the unloaded tilting segment and loaded tilting segment can deviate greatly from one another so that the amount of lubricant supplied can no longer completely fill the highly enlarged lubricating gap of the unloaded tilting segment.

In extreme cases, segment flutter leads to solid contact between the segment sliding face and the shaft surface and thus to damage or even destruction of the segment.

One possibility for reducing segment flutter consists in outfitting the bearing with a grooved lubrication so that the entire bearing is filled with lubricant. In this case, with regard to construction, a lateral seal is usually inserted at the axial bearing ends of the bearing housing that restricts the lateral flow of lubricating oil that is heated via the tilting segment out of the bearing housing. Accordingly, the lubricating film temperature is appreciably higher owing to the restricted outflow of warm lubricating oil from the slide bearing and, further, the power loss is also appreciably higher because of the increased fluid friction. Mechanical adjustments of this type for suppressing or reducing segment flutter are very costly.

Heretofore, there were no known solutions by which so-called segment flutter could be securely and reliably prevented by simple means.

SUMMARY OF THE INVENTION

In view of the foregoing, it is an object of one aspect of the present invention to provide a novel tilting segment for a shaft bearing device and a novel shaft bearing device.

According to one aspect of the invention, a groove that extends in axial direction and that is located nearer to the segment trailing edge than it is to the segment leading edge is incorporated in the slide bearing face. The invention makes it possible to securely and reliably prevent so-called segment flutter, particularly at relatively lightly loaded tilting segments of a shaft bearing device.

At the transition from the groove extending in axial direction, the height of the gap between tilting segment and the shaft supported by this shaft bearing device becomes narrower in vertical direction from the base of the axially extending groove to the slide bearing face that extends up to the segment trailing edge. Because of this narrowing of the gap and due to a difference in velocity between shaft and bearing and because the lubricant adheres to the shaft surface, there results a buildup of hydrodynamic pressure.

Because the axially extending groove lies nearer to the segment trailing edge than it does to the segment leading edge in circumferential direction and since, therefore, the gap narrowing is also nearer to the segment trailing edge than it is to the segment leading edge, the buildup of an additional hydrodynamic pressure takes place in the divergent area between the shaft and the tilting segment. As a result of hydrodynamic pressure being generated in the divergent area, this divergent area between the tilting segment and shaft is filled with lubricant. A complete filling of the divergent area would otherwise only be possible with grooved bearings that prevent lubricant from flowing off laterally. Filling the divergent gap prevents the movement of the tilting segment in direction of the now full divergent gap so that segment flutter is effectively countered.

The built-up hydrodynamic pressure causes the gap between tilting segment and shaft to be filled with lubricant in the divergent gap area between this tilting segment and this shaft. Accordingly, a heat exchange also takes place between the differently hot layers of lubricant between the shaft and tilting segment.

In this case, the transfer of heat in the region of the shaft surface is substantially improved through the partial transition into the turbulent flow regime with a corresponding increase in the Nusselt number (Nu), and Taylor vortices directed in circumferential direction are also partially generated and likewise lead to an improved heat transfer, and the shaft temperature and temperature level of the bearing accordingly decrease overall.

According to an advantageous further development, in direction of the circumferential extension U1 of the slide bearing face starting with 0% at the segment leading edge and ending with 100% at the segment trailing edge, a longitudinal central axis of the groove extending in axial direction is positioned in a portion of the slide bearing face located at between 60% and 90%, preferably between 60% and 80%, particularly preferably between 70% and 80%, of the circumferential extension U1 of the slide bearing face. Segment flutter can be countered in a particularly advantageous manner in this way.

According to another advantageous further development, the ratio VU=U2/U1 between the circumferentially extending groove width U2 of the groove extending in axial direction and the circumferential extension U1 of the slide bearing face extending between the segment leading edge and the segment trailing edge is $0.02 \leq VU \leq 0.20$, preferably $0.05 \leq VU \leq 0.20$, particularly preferably $0.05 \leq VU \leq 0.10$. These steps also allow segment flutter of a tilting segment to be effectively countered.

According to another advantageous further development, the ratio VL=L2/L1 between the axially extending groove length L2 of the groove extending in axial direction and the axial extension L1 of the slide bearing face extending between the lateral edges is $0.5 \leq VL < 1.0$, preferably $0.6 \leq VL < 1.0$, particularly preferably $0.7 \leq VL < 1.0$. This step is also advantageous for suppressing segment flutter at a tilting segment of a shaft bearing device.

Preferably, a circumferentially extending groove that extends into the axially extending groove proceeding from the segment leading edge is introduced into the slide bearing face. Oil can be conveyed into the axially extending groove proceeding from the segment leading edge through the groove extending in circumferential direction. The oil conveyed into this axially extending groove is heated to a lesser extent than the oil conveyed in circumferential direction from the segment leading edge to the sliding surface. Therefore, owing to the additional back-up of oil resulting from the hydrodynamic pressure, a heat exchange takes place between the differently heated oil flows in the divergent gap area. This likewise leads to the cooling of the shaft surface and to reduction of the temperature level in the shaft bearing device overall. As has already been stated, as a result of the hydrodynamic pressure ratios that are formed, not only can segment flutter be counteracted but, further, pronouncedly laminar hot oil layers at the shaft surface can be broken up.

In contrast to U.S. Pat. No. 6,361,215 B1, the grooves in the invention do not serve to hold back hot oil in the slide bearing for filling the divergent gap; rather, as a result of the tilting segment according to the invention, the hot oil is allowed to flow out of the slide bearing and the temperature level in the bearing can be decreased.

In addition or preferably as an alternative to the groove extending in circumferential direction, the groove extending in axial direction can have a bevel, specifically such that, viewed in circumferential direction, a groove depth of the groove extending in axial direction increases in direction of the segment trailing edge. Pronouncedly laminar hot oil layers can also be broken up in this way and turbulent oil flows and Taylor vortices running in the rotating direction of the shaft can be generated to improve the removal of heat from the shaft.

BRIEF DESCRIPTION OF THE DRAWINGS

Preferred further developments of the invention are indicated in the subclaims and the following description. Embodiment examples of the invention are described more fully with reference to the drawings without the invention being limited to these embodiment examples. In drawings:

FIG. 3 is a perspective view of a second tilting segment according to one aspect of the invention for a shaft bearing device;

FIG. 4 is a perspective view of a third tilting segment according to one aspect of the invention for a shaft bearing device; and FIG. 5 is a perspective view of a fourth tilting segment according to one aspect of the invention for a shaft bearing device.

DETAILED DESCRIPTION OF THE PRESENTLY PREFERRED EMBODIMENTS

The present invention is directed to a shaft bearing device for slide bearing support of a rotating shaft and to a tilting segment for a shaft bearing device of this type.

Figure 1:
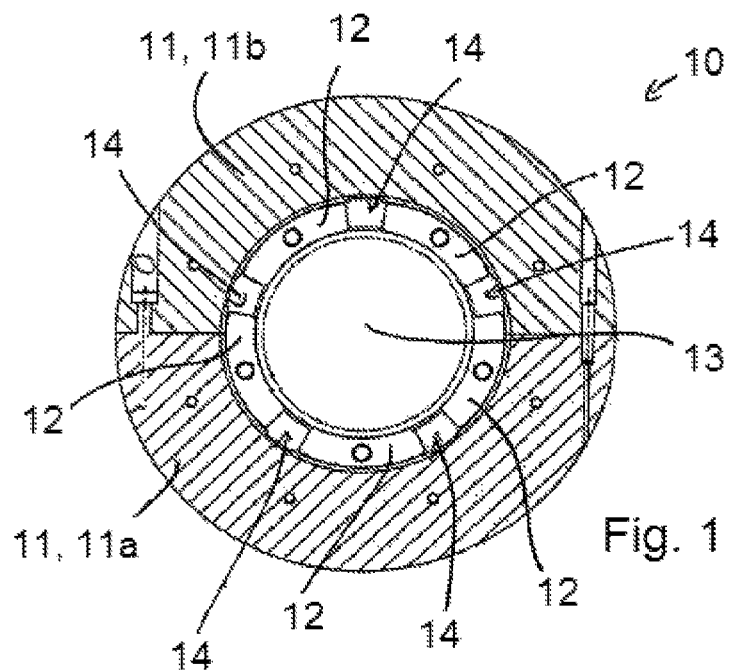
FIG. 1 is a schematic view of a shaft bearing device viewed axially.

In a highly schematic manner, FIG. 1 shows, looking axially, a shaft bearing device 10 for the slide bearing support of a rotating shaft 13, wherein the shaft bearing device 10 has a bearing base body 11 comprising two partial rings 11a, 11b in which a plurality of tilting segments 12 are received one behind the other viewed in circumferential direction. The tilting segments 12 are arranged radially outwardly in circumferential direction around the shaft 13 to be supported. A gap 14 for supplying lubricating oil in direction of the leading edge of the tilting segment 12, or front edge in rotating direction of the shaft, and for carrying away hot oil from the trailing edge of the tilting segment 12, or back edge in rotating direction of the shaft, is formed between adjacent tilting segments 12.

Figure 2:
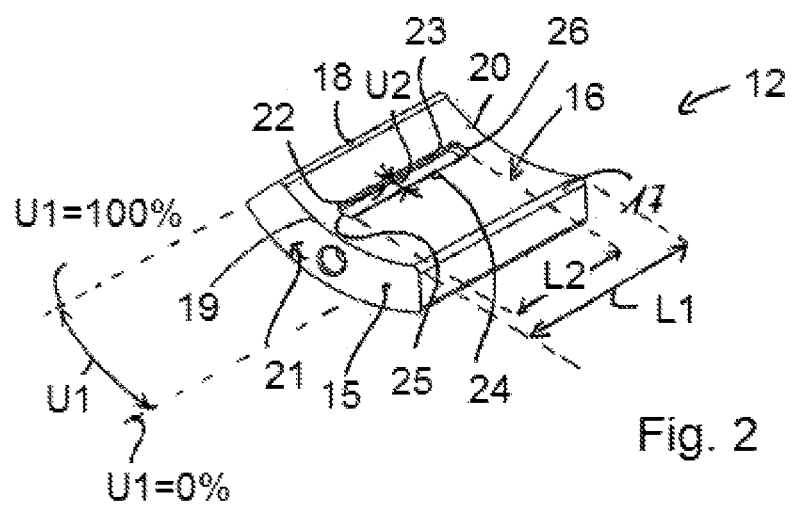
FIG. 2 is a perspective view of a first tilting segment according to one aspect of the invention for a shaft bearing device.

FIG. 2 shows a perspective view of an embodiment form of a tilting segment 12 for a shaft bearing device 10 of this type according to a first variant of the invention.

The tilting segment 12 has a base body 15 that forms a slide bearing face 16. The slide bearing face 16 is bounded by a segment leading edge 17 extending in axial direction, a segment trailing edge 18 likewise extending in axial direction, and by lateral edges 19, 20 extending in circumferential direction between the segment leading edge 17 and the segment trailing edge 18.

The segment leading edge 17 is that edge of the base body 15 of the tilting segment 12 that extends in axial direction and is positioned in front when viewed in the rotating direction of the shaft 13 to be supported. The segment trailing edge 18 is positioned in back when viewed in the rotating direction of the shaft 13 to be supported. The rotating direction of the shaft to be supported is designated by arrow 21 in FIG. 2.

Within the meaning of the present invention, a groove 22 extending in axial direction is introduced into the slide bearing face 16 in a portion of the slide bearing face 16 that is nearer to the segment trailing edge 18 than it is to the segment leading edge 17.

The tilting segment 12 is loaded by forces in operation, and that portion of the slide bearing face 16 of the tilting segment 12 in which the highest forces occur at the respective tilting segment 12 in operation is designated as main load zone of the respective tilting segment 12. The groove 22 extending in axial direction is positioned between this main load zone and the segment trailing edge 18 viewed in circumferential direction.

In operation, oil collects in the axially extending groove 22 positioned nearer to the segment trailing edge 18 than to the segment leading edge 17 so that an additional hydrodynamic pressure is built up in operation which causes a preloading for the respective tilting segment 12. Segment flutter at the respective tilting segment 12 can be suppressed in this way.

As has already been stated, the axially extending groove 22 inserted into the slide bearing face 16 is positioned nearer to the segment trailing edge 18 than it is to the segment leading edge 17, namely between the main load zone of the tilting segment 12 and the segment trailing edge 18 thereof. In direction of the circumferential extension U1 of the slide bearing face 16 starting with 0% at the segment leading edge 17 and ending with 100% at the segment trailing edge 18, a longitudinal central axis of the axially extending groove 22 is positioned in a portion of the slide bearing face 16 lying at between 60% and 90%, preferably between 60% and 80%, particularly preferably between 70% and 80%, of the circumferential extension U1 of the slide bearing face 16.

When the longitudinal central axis of the axially extending groove 22, and therefore also groove 22, is situated in a portion of the slide bearing face 16 occupying such a position, segment flutter can be countered in a particularly effective manner.

For the ratio $VU=U2/U1$ between the circumferentially extending groove width U2 of the axially extending groove 22 and the circumferential extension U1 of the slide bearing face 16 of the respective tilting segment 12, which circumferential extension U1 extends between the segment leading edge 17 and the segment trailing edge 18, the ratio is $0.02 \leq VU \leq 0.20$, preferably $0.05 \leq VU \leq 0.20$, particularly preferably $0.05 \leq VU \leq 0.10$.

A groove 22 with a groove width U2 of this kind has proven particularly advantageous for suppressing segment flutter.

In the embodiment example of FIG. 2, the groove 22 extending in axial direction is bounded by four groove walls, namely by a first groove wall 23 which extends in axial direction and faces the segment trailing edge 18, a second groove wall 24 which likewise extends in axial direction and is remote of the segment trailing edge 18, and by two lateral groove walls 25, 26 which extend between the first groove wall 23 and the second groove wall 24. The distance between the first groove wall 23 and the second groove wall 24, each of which extends in axial direction, determines the groove width U2 of groove 22, and the distance between the lateral groove walls 25, 26 determines an axially extending groove length L2 of the groove 22 extending in axial direction. The ratio $VL=L2/L1$ between the axially extending groove length L2 of the axially extending groove 22 and the axial extension L1 of the slide bearing face 16 extending between the lateral edges 19, 20 is $0.5 \leq VL < 1.0$, preferably $0.6 \leq VL < 1.0$, particularly preferably $0.7 \leq VL < 1.0$.

In the variant in FIG. 2, the axially extending groove 22, which is formed at the slide bearing face 16 of the tilting segment 12, is bounded on all sides by groove walls 23, 24, 25 and 26, the groove 22 having a constant groove depth viewed in radial direction. As shown, the groove 22 is defined by the slide bearing face 16 and extends in the axial direction. The groove 22 has axial ends 25, 26 and an uninterrupted floor between the axial ends. Each axial end 25, 26 of the groove arranged inboard of the lateral edges. The axial ends 25, 26 are formed by an uninterrupted wall extending from the slide bearing face to the uninterrupted floor.

FIG. 3 shows a further development of tilting segment 12 from FIG. 2. The variant in FIG. 3 differs from the variant in FIG. 2 in that a further groove 27 is incorporated in the slide bearing face 16 of the tilting segment 12, namely, a circumferentially extending groove 27, which extends into the axially extending groove 22 proceeding from the segment leading edge 17. Oil can be conveyed from the segment leading edge 17 into the axially extending groove 22 via this groove 27 extending in circumferential direction. This causes a buildup of hydrodynamic pressure which, on the one hand, breaks up a pronouncedly laminar hot oil layer forming at the shaft surface of the shaft 13 in operation and, on the other hand, provides for a turbulent oil flow and possible Taylor vortices running in the rotating direction of the shaft 13 to be supported. Overall, this facilitates removal of heat from the sliding surface 16 and shaft surface 13.

In the variant of FIG. 3, this groove 27 extending in circumferential direction runs into the center of the axial groove length L2 of the groove 22 extending in axial direction. In contrast, FIG. 4 shows a further development of the invention in which the groove 22 extending in circumferential direction runs adjacent to one of the lateral edges 19, 20 of the slide bearing face 16 and, in a lateral portion adjacent to a lateral groove wall 25, runs into the groove 22 extending in axial direction.

A further variant of a tilting segment 12 is shown in FIG. 5. In FIG. 5, there is only the groove 22 extending in axial direction but no groove extending in circumferential direction. Rather, the groove 22 extending in axial direction is characterized by a bevel, namely such that proceeding from the groove wall 24 remote of the segment trailing edge 18, the groove depth of groove 22 increases in direction of the groove wall 23 facing the segment trailing edge 18.

In this respect, the groove depth according to the illustration in FIG. 5 preferably ramps up linearly, i.e., steadily or continuously, in direction of the groove wall 23 facing the segment trailing edge 18.

Alternatively, the bevel can also be constructed with a radius.

The supply of oil into the axially extending groove 22 can be reinforced in this way so as to break up hot oil layers in the region of the shaft surface of the shaft 13 to be supported and, on the other hand, to generate a possible turbulent oil flow and Taylor vortices running in the rotating direction of the shaft 13 to be supported in order in this way ultimately to improve the transfer of heat and, therefore, the removal of heat from the segment 12 and the supported shaft 13.

It is also possible to combine this type of bevel of the groove 22 extending in axial direction according to FIG. 5 with a groove 27 extending in circumferential direction according to FIGS. 3 and 4.

By the invention, segment flutter of tilting segments 12 can be effectively and reliably countered. Further, the transfer of heat from the lubricating gap can be improved and the temperature level can accordingly be lowered.

The present invention is directed not only to a tilting segment 12 but also to a shaft bearing device 10 with at least one tilting segment 12 of this kind.

In operation, first tilting segments, which may be formed as tilting segments 12, of the shaft bearing device 10 are more highly loaded by forces than second tilting segments 12. In a shaft bearing device 10 for a horizontally extending shaft, the lower tilting segments 12 in particular are more highly loaded by forces than the upper tilting segments 12.

Preferably, exclusively those tilting segments 12, which are loaded relatively lightly by forces, i.e., exclusively at least one of the second tilting segments 12, are configured in the manner described with reference to FIGS. 2 to 5.

Preferably, all of the second tilting segments which are loaded by forces to an extent below a limiting value are configured as described with reference to FIGS. 2 to 5.

The first tilting segments which are loaded by forces to an extent greater than the limiting value are preferably constructed in such a way that no grooves are incorporated in the slide bearing face 16 thereof.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tilting segment for a shaft bearing device, comprising:
   a base body having a slide bearing face bounded by:
      a segment leading edge extending in an axial direction;
      a segment trailing edge extending in the axial direction; and
      lateral edges extending in a circumferential direction between the segment leading edge and the segment trailing edge; and
   a groove, defined by the slide bearing face, that extends in the axial direction having axial ends and an uninterrupted floor between the axial ends and is located nearer to the segment trailing edge than the segment leading edge, each axial end of the groove arranged inboard of the lateral edges, a first groove wall that extends in the axial direction and faces the segment trailing edge, and a second groove wall that extends in the axial direction and is remote of the segment trailing edge, each of the axial ends, the first groove wall, and the second groove wall formed by a respective uninterrupted wall extending from the slide bearing face to the uninterrupted floor.

2. The tilting segment according to claim 1, wherein, in a direction of a circumferential extension U1 of the slide bearing face starting with 0% at the segment leading edge and ending with 100% at the segment trailing edge, a longitudinal central axis of the groove extending in the axial direction is positioned in a portion of the slide bearing face located at between 60% and 90% of the circumferential extension U1 of the slide bearing face.

3. The tilting segment according to claim 2, wherein, the longitudinal central axis of the groove is located at between 60% and 80% of the circumferential extension U1 of the slide bearing face.

4. The tilting segment according to claim 3, wherein, the longitudinal central axis of the groove is located at between 70% and 80%, of the circumferential extension U1 of the slide bearing face.

5. The tilting segment according to claim 2, wherein a ratio $VU=U2/U1$ between a circumferentially extending groove width U2 of the groove extending in the axial direction and the circumferential extension U1 of the slide bearing face extending between the segment leading edge and the segment trailing edge is $0.02 \leq VU \leq 0.20$.

6. The tilting segment according to claim 5, wherein the ratio $VU=U2/U1$ is $0.05 \leq VU \leq 0.20$.

7. The tilting segment according to claim 6, wherein the ratio $VU=U2/U1$ is $0.05 \leq VU \leq 0.10$.

8. The tilting segment according to claim 5, wherein a ratio $VL=L2/L1$ between an axially extending groove length L2 of the groove extending in the axial direction and an axial extension L1 of the slide bearing face extending between the lateral edges is $0.5 \leq VL < 1.0$.

9. The tilting segment according to claim 8, wherein the ratio $VL=L2/L1$ is $0.6 \leq VL < 1.0$.

10. The tilting segment according to claim 9, wherein the ratio $VL=L2/L1$ is $0.7 \leq VL < 1.0$.

11. The tilting segment according to claim 1, wherein
    the axially extending groove has a constant groove depth between the first groove wall and the second groove wall.

12. The tilting segment according to claim 1, wherein
    a groove depth of the axially extending groove increases proceeding from the second groove wall in direction of the first groove wall.

13. A shaft bearing device for slide bearing support of a rotating shaft, comprising:
    a bearing base body in which a plurality of tilting segments are received one behind the other in a circumferential direction,
    wherein, in operation, first tilting segments are more highly loaded by forces than second tilting segments,
    wherein at least one of the plurality of tilting segments is configured as a second tilting segment and comprises:
       a base body having a slide bearing face bounded by:
          a segment leading edge extending in an axial direction;
          a segment trailing edge extending in the axial direction, and
          lateral edges extending in the circumferential direction between the segment leading edge and the segment trailing edge;
    a groove, defined by the slide bearing face, that extends in the axial direction having axial ends and an uninterrupted floor between the axial ends and is located nearer to the segment trailing edge than the segment leading edge, each axial end of the groove arranged inboard of the lateral edges, the axial ends formed by an uninterrupted wall extending from the slide bearing face to the uninterrupted floor.

14. The shaft bearing device according to claim 13, wherein all of the tilting segments comprise:
- the base body having the slide bearing face bounded by:
  - the segment leading edge extending in the axial direction;
  - the segment trailing edge extending in the axial direction, and
  - the lateral edges extending in the circumferential direction between the segment leading edge and the segment trailing edge; and
- the groove defined by the slide bearing face that extends in the axial direction having the axial ends and is located nearer to the segment trailing edge than the segment leading edge, each axial end of the groove arranged inboard of the lateral edges.

* * * * *